United States Patent
Kuo et al.

(10) Patent No.: US 12,541,290 B2
(45) Date of Patent: Feb. 3, 2026

(54) IMAGE SELECTION USING MACHINE LEARNING

(71) Applicant: DoorDash, Inc., San Francisco, CA (US)

(72) Inventors: Chun-Chen Kuo, San Francisco, CA (US); Yu Zhang, Sunnyvale, CA (US)

(73) Assignee: DoorDash, Inc., San Francisco, CA (US)

( * ) Notice: Subject to any disclaimer, the term of this patent is extended or adjusted under 35 U.S.C. 154(b) by 147 days.

(21) Appl. No.: 18/526,968

(22) Filed: Dec. 1, 2023

(65) Prior Publication Data

US 2024/0184436 A1    Jun. 6, 2024

Related U.S. Application Data

(60) Provisional application No. 63/429,828, filed on Dec. 2, 2022.

(51) Int. Cl.
*G06F 40/166*    (2020.01)
*G06F 3/04842*    (2022.01)
*H04L 51/10*    (2022.01)

(52) U.S. Cl.
CPC ........ *G06F 3/04842* (2013.01); *G06F 40/166* (2020.01); *H04L 51/10* (2013.01)

(58) Field of Classification Search
CPC .................................................... G06F 40/166
USPC ........................................................ 715/234
See application file for complete search history.

(56) References Cited

U.S. PATENT DOCUMENTS

| | | | |
|---|---|---|---|
| 6,384,850 B1 * | 5/2002 | McNally | G06F 16/9577 715/810 |
| 6,871,325 B1 | 3/2005 | McNally et al. | |
| 6,982,733 B1 * | 1/2006 | McNally | G06F 16/9577 715/810 |
| 8,146,077 B2 | 3/2012 | McNally et al. | |
| 9,009,060 B2 | 4/2015 | McNally | |
| 9,747,651 B2 | 8/2017 | McNally | |
| 10,970,797 B2 | 4/2021 | McNally | |
| 11,276,130 B2 * | 3/2022 | McNally | H04M 3/4938 |

(Continued)

FOREIGN PATENT DOCUMENTS

WO    0122289 A1    3/2001

OTHER PUBLICATIONS

Zhang, "Homepage Recommendation with Exploitation and Exploration", available online at [https://careersatdoordash.com/blog/homepage-recommendation-with-exploitation-and-exploration/], published on Oct. 5, 2022 (Year: 2022).*

(Continued)

*Primary Examiner* — Reza Nabi
(74) *Attorney, Agent, or Firm* — Kilpatrick Townsend & Stockton LLP

(57) ABSTRACT

A method is disclosed. The method includes receiving, by a server computer, a plurality of images associated with one or more service providers. The server computer then receives an inquiry request, and determines an image of the plurality of images. The image is selected in response to a composite score based on a scoring algorithm scoring each image in the plurality of images. The scoring algorithm comprises a conversion component and an uncertainty component. The server computer provides an inquiry response comprising the image to the end user device operated by the end user.

18 Claims, 11 Drawing Sheets

(56) References Cited

U.S. PATENT DOCUMENTS

| | | | |
|---|---|---|---|
| 11,347,803 B2* | 5/2022 | Prabhugaonkar | ........................... G06F 16/90332 |
| 11,392,751 B1* | 7/2022 | Szarvas | ................. G06N 3/043 |
| 11,842,415 B2 | 12/2023 | McNally | |
| 11,847,587 B1* | 12/2023 | McNally | ............ G06Q 30/0621 |
| 12,165,027 B1* | 12/2024 | Chong | ................... G06N 20/00 |
| 2005/0204308 A1* | 9/2005 | McNally | ............ G06F 16/9577 715/810 |
| 2006/0020497 A1* | 1/2006 | McNally | ............ G06Q 30/0643 705/5 |
| 2006/0247973 A1* | 11/2006 | Mueller | ................. G06Q 20/20 705/26.1 |
| 2010/0138452 A1* | 6/2010 | Henkin | ................. G06Q 30/02 707/803 |
| 2010/0306249 A1* | 12/2010 | Hill | ..................... G06F 16/9535 707/769 |
| 2014/0249937 A1* | 9/2014 | McNally | ............ H04M 3/4938 705/15 |
| 2014/0339542 A1* | 11/2014 | Yamazaki | .......... H10D 30/6757 257/43 |
| 2018/0005328 A1* | 1/2018 | McNally | ............ G06Q 30/0641 |
| 2021/0065318 A1* | 3/2021 | McNally | ............ G06Q 30/0621 |
| 2021/0357745 A1* | 11/2021 | Wallis | ...................... G06N 3/04 |
| 2021/0358178 A1* | 11/2021 | Staudigl | ............... H04N 19/192 |
| 2021/0390577 A1* | 12/2021 | Cohen | ................ G06Q 30/0246 |
| 2022/0156858 A1* | 5/2022 | McNally | ............ G06Q 30/0623 |
| 2023/0222676 A1* | 7/2023 | Jafari-Khouzani | ..... G06T 7/337 382/100 |
| 2023/0401274 A1* | 12/2023 | Denninghoff | ...... G06Q 30/0251 |
| 2024/0184436 A1* | 6/2024 | Kuo | ...................... G06F 3/0482 |
| 2024/0211541 A1* | 6/2024 | Belharbi | ................ G16H 30/40 |
| 2024/0256556 A1* | 8/2024 | Ali | ......................... G06F 9/451 |
| 2024/0292060 A1* | 8/2024 | Levy | ................... H04N 21/4532 |
| 2025/0013414 A1* | 1/2025 | Zhang | ...................... G06N 7/01 |
| 2025/0245723 A1* | 7/2025 | Nag | .................. G06Q 30/0201 |

OTHER PUBLICATIONS

Zhang, "Homepage Recommendation with Exploitation and Exploration", DoorDash Engineering, Oct. 5, 2022, 32 pages.

"Civil Action No. 2:23-CV-2165-WSH", Amended Complaint for Patent Infringement—*Ameranth, Inc.*, Plaintiff, v. *Doordash, Inc., Eat'n Park Restaurants, LLC*, and *Eat'n Park Hospitality Group, Inc.*, Defendants, Sep. 17, 2024, pp. 1-91.

"Unpublished U.S. Appl. No. 18/145,942", filed Dec. 23, 2022.

* cited by examiner

| UNCERTAINTY-MULTIPLIER | PROBABILITY-OF-IMAGE-CHANGE-AFTER-3-VIEWS | PROBABILITY-OF-IMAGE-CHANGE-AFTER-4-VIEWS | PROBABILITY-OF-IMAGE-CHANGE-AFTER-5-VIEWS | PROBABILITY-OF-IMAGE-CHANGE-AFTER-6-VIEWS | PROBABILITY-OF-IMAGE-CHANGE-AFTER-7-VIEWS |
|---|---|---|---|---|---|
| 0 | 0% | 0% | 0% | 0% | 0% |
| 0.001 | 19.0% | 21.5% | 23.0% | 24.0% | 24.7% |
| 0.005 | 39.0% | 47.7% | 52.2% | 55.1% | 57.0% |
| 0.01 | 56.7% | 67.2% | 72.0% | 74.7% | 76.5% |
| 0.05 | 93.6% | 96.6% | 97.4% | 97.8% | 98.0% |

FIG. 7

IMAGE SELECTION USING MACHINE LEARNING

CROSS-REFERENCES TO RELATED APPLICATIONS

This application is a non-provisional application, which claims priority to U.S. Provisional Application No. 63/429,828, filed on Dec. 2, 2022, which is herein incorporated by reference.

SUMMARY

One embodiment of the invention includes a method. The method receiving, by a server computer, a plurality of images associated with one or more service providers; receiving, by the server computer from an end user device operated by an end user, an inquiry request; determining, by the server computer, an image of the plurality of images, wherein the image is selected in response to a composite score based on a scoring algorithm scoring each image in the plurality of images, wherein the scoring algorithm comprises a conversion component and an uncertainty component; and providing, by the server computer, an inquiry response comprising the image to the end user device operated by the end user.

Another embodiment of the invention comprises a server computer comprising: a processor; and a computer readable medium comprising code, executable by the processor for performing a method comprising: receiving a plurality of images associated with one or more service providers; receiving, from an end user device operated by an end user, an inquiry request; determining an image of the plurality of images, wherein the image is selected in response to a composite score based on a scoring algorithm scoring each image in the plurality of images, wherein the scoring algorithm comprises a conversion component and an uncertainty component; and providing an inquiry response comprising the image to the end user device operated by the end user.

Another embodiment comprises a system comprising: a server computer, server computer comprising: a processor; and a computer readable medium comprising code, executable by the processor for performing a method comprising: receiving a plurality of images associated with one or more service providers; receiving, from an end user device operated by an end user, an inquiry request; determining an image of the plurality of images, wherein the image is selected in response to a composite score based on a scoring algorithm scoring each image in the plurality of images, wherein the scoring algorithm comprises a conversion component and an uncertainty component; and providing an inquiry response comprising the image to the end user device operated by the end user.

These and other embodiments are described with reference to the following detailed description and accompanying drawings.

BRIEF DESCRIPTION OF THE DRAWINGS

FIG. 7 shows an example table of probability of image change for different multiplier values.

DETAILED DESCRIPTION

Figure 1:
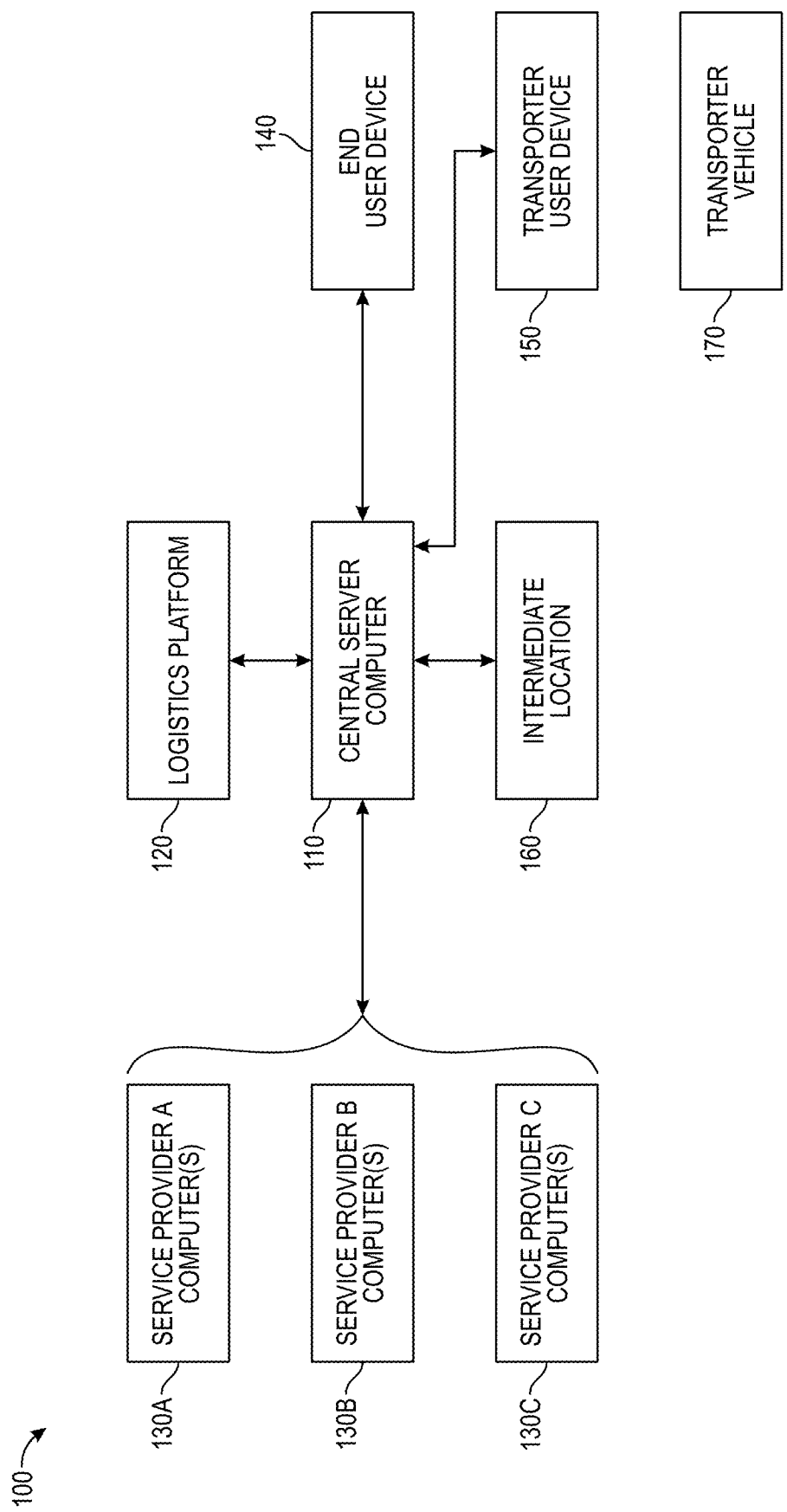
FIG. 1 shows a block diagram of a system according to embodiments.

Prior to discussing specific embodiments of the invention, some terms can be described in further detail.

An "item" can be an individual article or unit. Examples of items can include perishable items such as food items, beauty items (e.g., cosmetics), office supply products (e.g., staples, paper, and ink), hardware items (e.g., nails, hammers, wrenches), electronic devices (e.g., computers, phones, etc.), jewelry, etc.

A "user" may include an individual. In some embodiments, a user may be associated with one or more personal accounts and/or mobile devices. In some embodiments, the user may be a consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with other entities. Examples of user devices may include a mobile device, a laptop or desktop computer, a wearable device, etc.

A "server computer" is typically a powerful computer or cluster of computers. For example, the central server computer can be a large mainframe, a minicomputer cluster, or a group of servers functioning as a unit. In one example, the central server computer may be a database server coupled to a Web server. The central server computer may also be a cloud based server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "fulfillment request" can be a request to provide one or more items. For example, a fulfillment request can include an initial communication from an end user device to a central server computer for a service provider computer to fulfill a purchase request for an item such as food.

A "transporter" can be an entity that transports something. A transporter can be a person that transports an item using a transportation device (e.g., a car). In other embodiments, a transporter can be a transportation device that may or may not be operated by a human. Examples of transportation devices include cars, boats, scooters, bicycles, drones, airplanes, etc.

"Machine learning" can include an artificial intelligence process in which software applications may be trained to make accurate predictions through learning. The predictions can be generated by applying input data to a predictive model formed from performing statistical analyses on aggregated data.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on feature vectors or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, which can be collections of artificial "neurons" that perform functions by activating in response to inputs.

A "feature" can be an individual measurable property or characteristic of a phenomenon. A feature can be described by a feature vector. A feature can be input into a model to determine an output. As an example, in pattern recognition and machine learning, a feature vector is an n-dimensional vector of numerical features that represent some object. Algorithms in machine learning require a numerical representation of objects since such representations facilitate processing and statistical analysis. When representing images, the feature values might correspond to the pixels of an image. When representing text, however, the features might be the frequencies of occurrence of textual terms. Feature vectors are equivalent to the vectors of explanatory variables used in statistical procedures such as linear regression. Feature vectors can be combined with weights using a dot product in order to construct a linear predictor function that is used to determine a score for making a prediction.

Embodiments of the invention address problems associated with image presentation to end users and facilitating conversion with respect to those images. In some cases, a large number of images can be presented to an end user with the desire to cause the end user to perform a conversion with respect to an image. If the presentation of those images does not result in an actual conversion, then computing resources as well as the end user's time may be wasted.

As an illustration, when an end user operating an end user device uses a delivery application (e.g., food delivery application) to order an item (e.g., food), the delivery application may display a plurality of service providers (e.g., restaurants) to the end user. The service providers can be represented by images of food items that they provide. The end user can browse the plurality of service providers and select a service provider from which to order food. The images shown to represent each service provider may influence the end user's decision in selecting the service provider.

A poorly selected image can negatively impact the user experience, so an optimized method for determining an image to be displayed is needed. Sometimes, the image of an item from the service provider displayed in the delivery application may be a static image across various discovery surfaces of the delivery application. If the user searches for hamburger, the resulting restaurants that sell hamburgers may still display an image of salad, confusing the end user. Also, sometimes, the image of the item displayed to the user may not be representative of the service provider (e.g., displaying an image of a drink for a service provider specializing in pizza). This can problematically result in the display of an excessive number of images to the end user.

Embodiments can enhance the user experience by providing improved methods and systems for selecting images to be displayed to an end user (e.g., in a delivery application). In embodiments of the invention, a central server computer can receive a plurality of images associated with one or more service providers, and an inquiry request from an end user device operated by an end user. A composite score is generated using a scoring algorithm that scores each image in the plurality of images. The scoring algorithm can have a conversion component and an uncertainty component. The central server computer can then select an image of the plurality of images. The central server computer can provide an inquiry response comprising the image to the end user device operated by the end user.

Embodiments can rotate an image displayed in the delivery application with a different image. For example, when the end user opens the delivery application, there may be a plurality of service providers, each associated with an image. One service provider may display an image of a chicken salad. The image may not be appealing to the end user and the end user may be uninterested. Embodiments can rotate the image so that later, the user may see the same service provider associated with an image of a different item, such as a hamburger. The new image may be higher quality or more relevant to the end user's preferences, thus increasing the likelihood that the end user will perform a conversion process (e.g., place an order for the item in the image).

Embodiments can determine the image to rotate using an image filtration and a scoring algorithm. Furthermore, some embodiments can enable the delivery application to display an image reflective of the search term entered by the end user for each service provider when the user searches for service providers with a specific item.

FIG. 1 shows a system according to embodiments. FIG. 1 shows a number of components, but there can be more or fewer components in the system in embodiments of the invention. For example, although three service provider computers are shown in FIG. 1, there can be more than three service provider computers in other embodiments of the invention.

The system in FIG. 1 includes a central server computer 110 in communication with an end user device 140, and one or more transporter user devices 150. The one or more transporter user devices 150 may be operated by one or more transporters (e.g., delivery couriers), who may travel in one or more transporter vehicles 170 (e.g., cars). The central server computer 110 may also be in communication with a logistics platform 120 and an intermediate location 160. The intermediate location 160 may include a kitchen, a vending machine, a temperature-controlled storage facility, etc. The intermediate location 160 can be a transport hub.

The central server computer 110 may be in communication with one or more service provider computers including a first service provider computer A 130A, second service provider computer B 130B, and a third service provider computer C 130C. The first, second, and third service provider computers A-C 130A-130C may be operated by first, second, and third service providers (e.g., three different merchants or restaurants), respectively. The first, second, and third service provider computers A-C 130A-130C can communicate with the central server computer 110 via one or more APIs. Service providers may initially present items such as goods and/or services to end users via an application (e.g., a delivery application) on the end user device 140. In some embodiments, an end user can interact with the application on the end user device to purchase items from the service providers 130A-130C.

The logistics platform 120 can be part of the central server computer 110 or can be system that is separate from the central server computer 110. The logistics platform 120 can include a location determination system, which can determine the location of various user devices such as transporter user devices (e.g., transporter user device 150) and end user devices (e.g., end user device 140). The logistics platform 120 can also include routing logic to efficiently route a delivery of items to the end users. Efficient routes can be determined based on the location of the transporter user devices 150 operated by the transporters, the location of the items to be delivered, the intermediate location 160, the location of the end user that operates the end user device 140, as well as external data such as traffic patterns, the weather, etc. The transporters using the transporter user devices 150 can follow the route provided by the logistics platform 120 in order to execute the delivery.

The communication networks that allow the entities in FIG. 1 to communicate may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocol such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
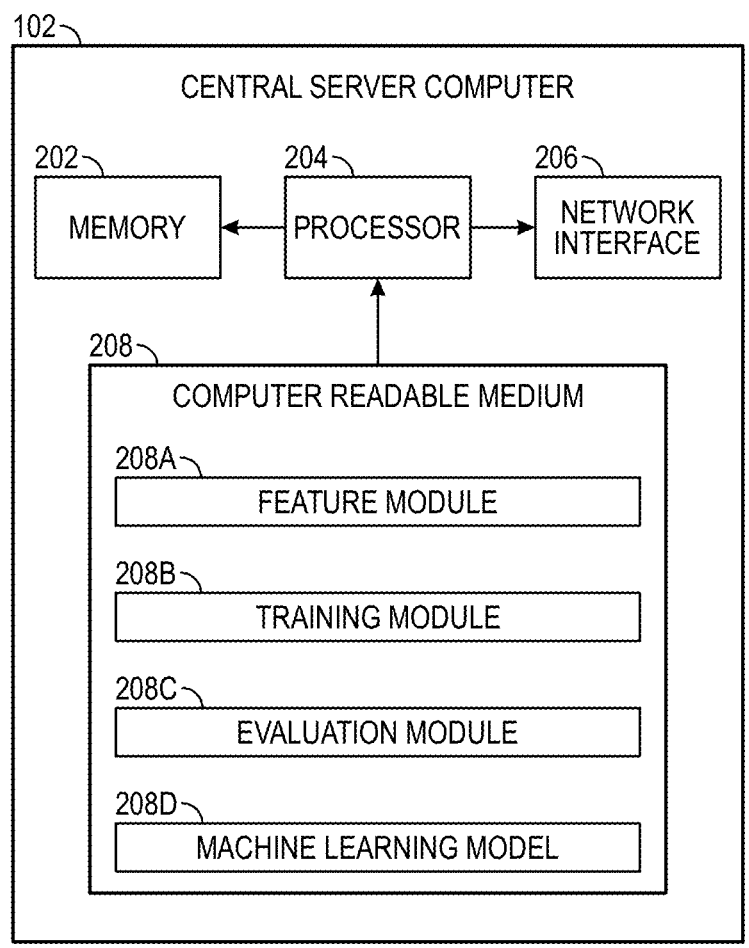
FIG. 2 shows a block diagram of a central server computer according to embodiments.

FIG. 2 shows a block diagram of a central server computer 102 according to embodiments. The exemplary central server computer 102 may comprise a processor 204. The processor 204 may be coupled to a memory 202, a network interface 206, and a computer readable medium 208. The computer readable medium 208 can comprise a feature module 208A, a training module 208B, an evaluation module 208C, and a machine learning model 208D.

The memory 202 can be used to store data and code. For example, the memory 202 can store input data, features, machine learning models, weights, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving a plurality of images associated with one or more service providers; receiving, from an end user device operated by an end user, an inquiry request; determining an image of the plurality of images, wherein the image is selected in response to a composite score based on a scoring algorithm scoring each image in the plurality of images, wherein the scoring algorithm comprises a conversion component and an uncertainty component; and providing an inquiry response comprising the image to the end user device operated by the end user.

The feature module 208A may comprise code or software, executable by the processor 204, for determining and/or evaluating features. The feature module 208A, in conjunction with the processor 204, can extract features from a dataset. Feature extraction can start from an initial set of measured data (e.g., data from the dataset). The feature module 208A, in conjunction with the processor 204, can obtain the dataset from a memory or database. The feature module 208A, in conjunction with the processor 204, can build derived values (e.g., features) from the dataset that can be intended to be informative and non-redundant, facilitating the subsequent learning and generalization steps, and in some cases leading to better human interpretations. Feature extraction can be related to dimensionality reduction of the dataset.

The training module 208B can include may comprise code or software, executable by the processor 204, for training machine learning model(s). The process of training a machine learning model involves providing a machine learning algorithm with training data to learn from. The training module 208B, in conjunction with the processor 204, can input training data into the machine learning model for training. The training data can include labels that indicate the target attribute of the data (e.g., a label indicating a value and rank that the machine learning model is trained to determine).

The evaluation module 208C can include may comprise code or software, executable by the processor 204, for evaluating data and machine learning model(s). The evaluation module 208C, in conjunction with the processor 204, can utilize the trained machine learning model to obtain predictions on new data for which the target (e.g., the predicted value and the predicted rank) are unknown. The evaluation module 208C, in conjunction with the processor 204, can input images and users' data into the trained machine learning model for evaluation. The trained machine learning model can output a predicted value and a predicted rank for the images with respect to users.

The machine learning model 208D can include any of the above described machine learning models including neural networks, support vector machines, XGBoost models, etc.

The network interface 206 may include an interface that can allow the central server computer 102 to communicate with external computers. Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the central server computer 102 may be in operative communication with one or more databases. For example, the central server computer 102 can communicate with a dataset database and/or a features database. The databases may be conventional, fault tolerant, relational, scalable, secure databases such as those commercially available from Oracle™ or Sybase™.

Figure 3:
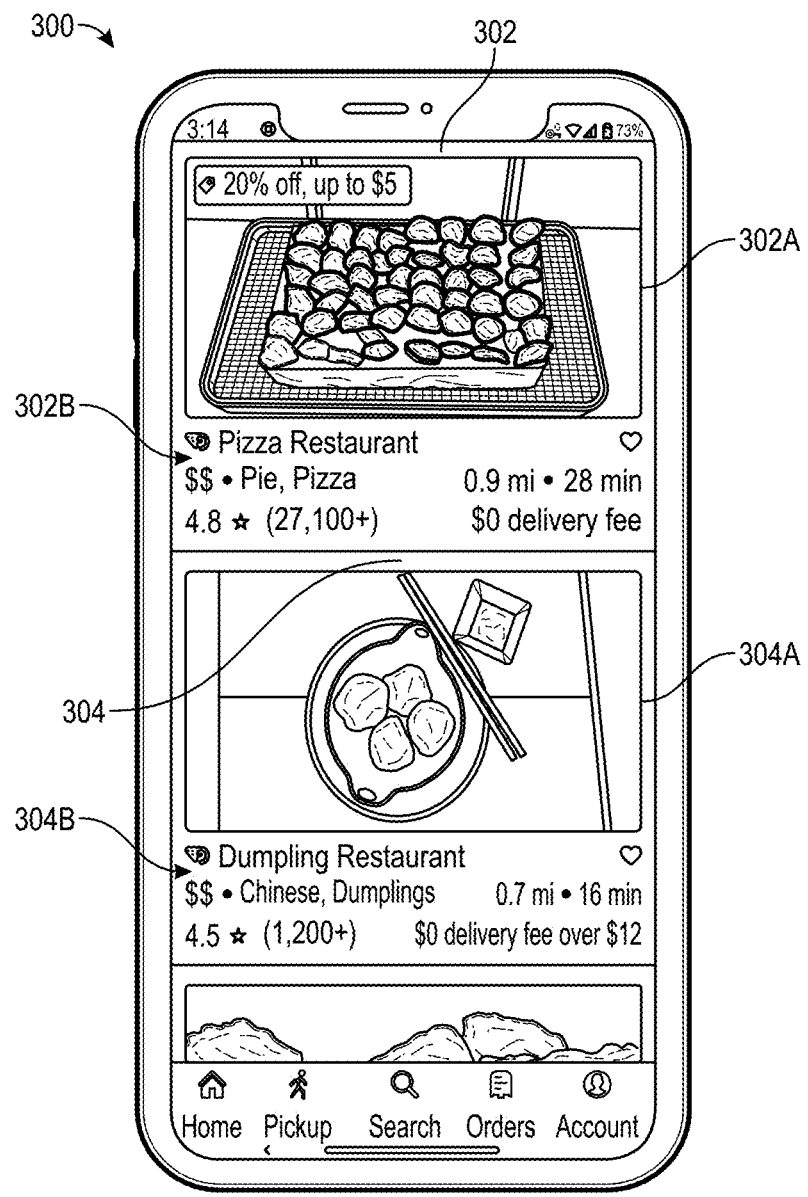
FIG. 3 shows an example page of a delivery application.

FIG. 3 shows an example homepage of a delivery application on the end user device operated by the end user. The homepage can display a plurality of service providers in a list. The end user can navigate through the list (e.g., scroll) and select a service provider to view items offered by the service provider. For each service provider, the homepage can display a picture representative of the service provider and details regarding the service provider. The details can include distance to the end user, estimated delivery time, delivery fee, price range, review, etc. To illustrate, one service provider of the plurality of service providers can be the Pizza Restaurant 302. The main item of the Pizza Restaurant 302 can be displayed in an image of a pizza 302A, with details 302B. Below it, an image of dumplings 304A and details 302B can be displayed in association with another service provider, the Dumpling Restaurant 304.

Figure 4:
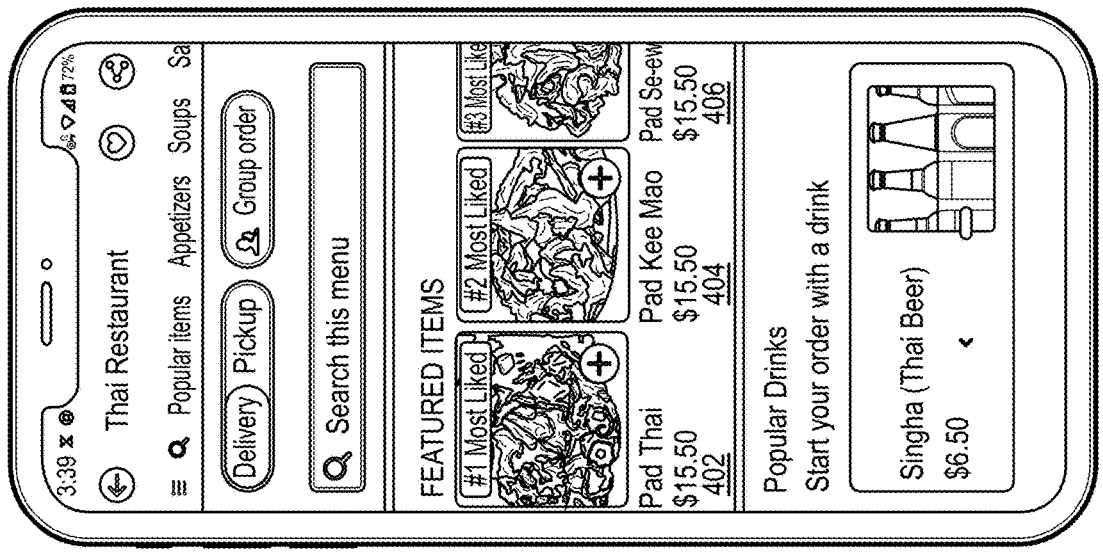
FIG. 4 shows example service provider pages in a delivery application.
Figure 4:
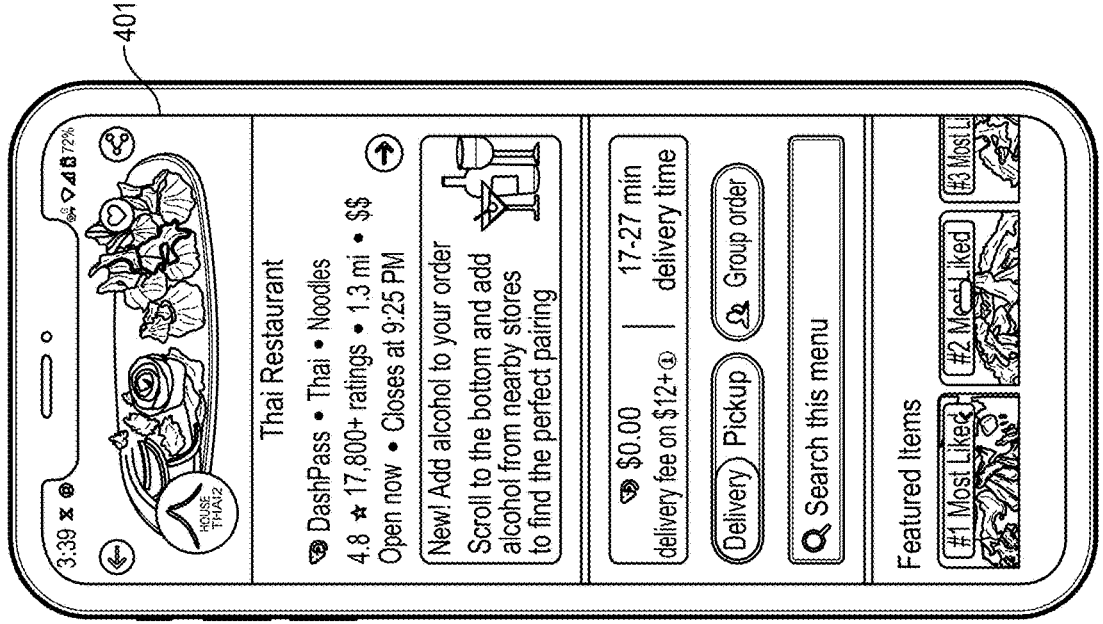

When an end user selects a service provider from the list of service providers (e.g., the example homepage in FIG. 3), the delivery application can display a service provider page as shown in FIG. 4. For example, the end user may select the service provider (e.g., "Thai Restaurant") from a plurality of service providers listed in a homepage. Upon the selection of the service provider, the delivery application can display the store page 400 shown in FIG. 3. The store page 400 can have a header image 401 and images representing featured items that the service provider can provide can be on a subsequent page 402. The items can be the most popular items or items manually selected by the service provider. For example, the images representing featured items can comprise a Pad Thai image 402, a Pad Kee Mao image 404, and a Pad Se-ew image 406.

Sometimes, the image shown on the homepage may not accurately represent the service provider. For example, the central server computer may select an image of a salad and display it as the main image for the Pizza Restaurant 302. Although Pizza Restaurant 302 may offer a salad item, it may not be a main item associated with the Pizza Restaurant 302. Also, sometimes, the image shown may be low quality. For example, the central server computer may display a blurry image or an off-center image of Pad Thai for the Thai Restaurant.

Embodiments of the invention can use a scoring algorithm to improve the relevance of an image displayed on a page (e.g., a homepage) of a delivery application (or browser). A central server computer (or generically a "server computer) can receive a plurality of images associated with one or more service providers, receive an inquiry request from an end user device, select an image based on a scoring algorithm that comprises a conversion component and an uncertainty component, and provide an inquiry response with the selected image to the end user device. The central server computer can use the scoring algorithm to calculate a composite score for each image in the plurality of images. When the central server computer selects the image in the plurality of images with the highest composite score, it can display it in the delivery application.

Figure 5:
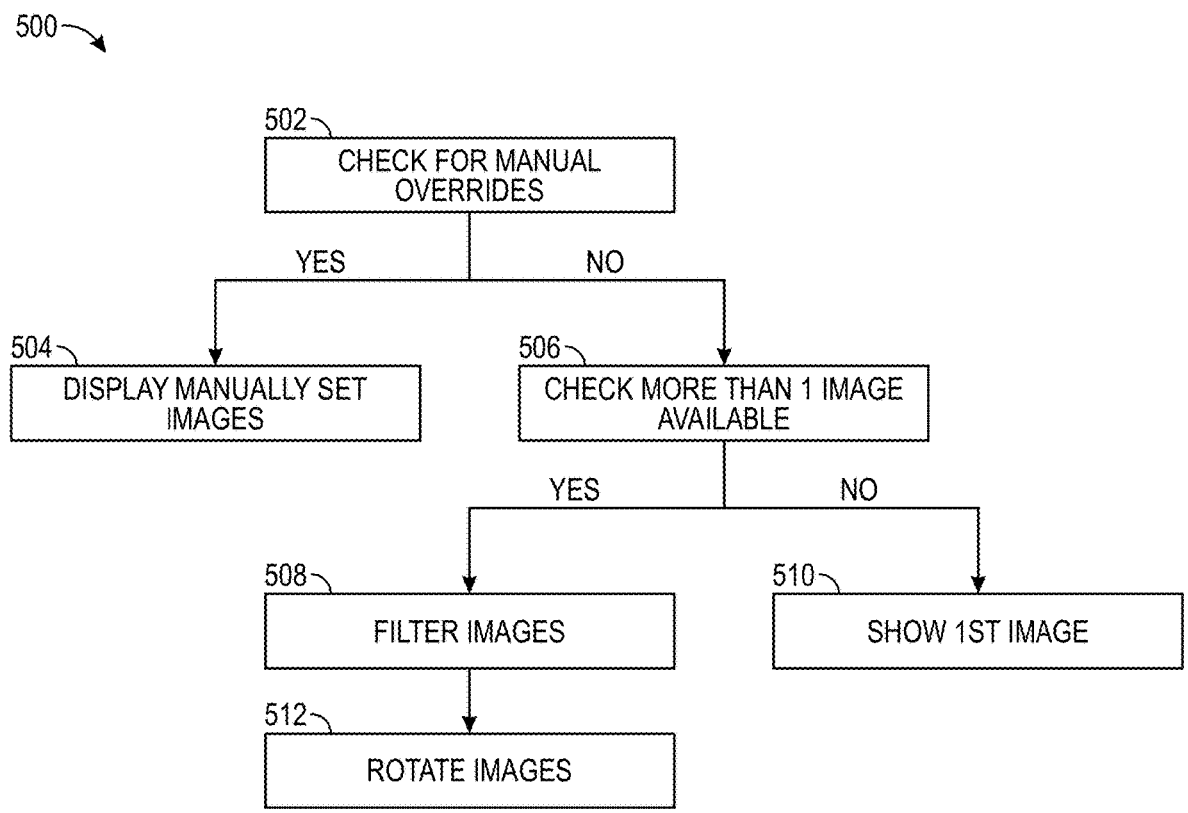
FIG. 5 shows a process flow for image filtration.

Before creating and/or using the scoring algorithm, the central server computer can perform image filtering and collect image rotation data as shown in the process flow 500 in FIG. 5. The central server computer can receive a plurality of images of items (i.e., image data for the plurality of images of items) of a service provider that can be displayed in the delivery application. The plurality of images may comprise images of the most popular items for the service provider. For example, with respect to the example in FIG. 3, the plurality of images can comprise a header image 401 (that can represent the service provider) and a Pad Thai image 402, a Pad Kee Mao image 404, and a Pad Se-ew image 406.

The central server computer can check for manual overrides in 502. In some embodiments, the service provider can have an option of not applying the scoring algorithm. The service provider can manually select a fixed image to be used. In such case, in step 504, the central server computer can display in the delivery application the fixed image from the service provider if that is the preference of the service provider.

If there is no manual override, the central server computer can check if there is more than one image available in step 506. Image rotation is not possible when the central server computer only receives one image, so if there is only one image, then that image will be statically shown in the delivery application in 510. For example, if the central server computer received only one image (e.g., pizza) on behalf of the service provider the Pizza Restaurant, there is no other image to rotate. Thus, the one image that the central server computer received will be statically shown in the delivery application.

If the central server computer receives more than one image, then the central server computer can filter the plurality of images in 508. Image filtration can filter out the plurality of images that may not be representative of the service provider. This can be done by putting in different rules or tags for service providers. For example, featured images of a restaurant should not be drinks or side food items (unless that was the service provider's primary selling point). Other examples can include filtering out images of a menu, a company logo, etc.

In step 512, the images that remain after the filtering can be rotated in the delivery application. If there is only one image remaining after filtering, then that image may be displayed statically and image rotation may not occur.

During image rotation the central server computer can rotate the image displayed in the delivery application using the images that remain after filtering. The central server computer can rotate images randomly and determine an initial conversion rate for each image. The initial conversion rate can be a number of orders made divided by a number of impressions (i.e., number of times the images have been displayed). For example, a restaurant may have a plurality of images comprising hamburger and pasta. The restaurant may have displayed the hamburger image 50 times randomly to users and among the 50 number of impressions, 10 orders may have been made by users. Then the initial conversion rate for hamburger image can be 10/50=0.2.

Image rotation can showcase a wider selection of items from a store menu compared to a situation where a static image is displayed. However, though rotating images can help drive improvements in homepage clicks and new service provider trials of the delivery application, it can also have a negative impact on homepage conversions (e.g., ordering food from a service provider listed on the homepage). For example, fresher images can enhance user experience by attracting user interest and click-throughs to service provider pages, but it can also negatively impact user experience. Some click-throughs to the service provider page may be users that are confused that a previously rejected service provider shows up differently (via different image) on the delivery application. The user may again reject the previously rejected service provider. This additional friction (rejecting the same service provider again) can take away the time users could have spent exploring other service providers.

Additionally, the images of the items that are the most popular from the service provider may not be high-quality or compelling. In some embodiments, some images of items most popular from the service provider may be poor representatives of the service provider's selection and items.

To solve these problems, one way to optimize rotating images can be to run a one-time analysis based on previous data. However, using the one-time analysis can present several problems. One problem can be new images do not have a chance to be shown to users. The initial conversion rate is 0 for a new image but it may be an image with high quality. Another problem may be users' tastes may change over time. The image which drove most conversion in the past may not guaranteed to drive most conversion in the future. If the same image is constantly shown, there is no chance for other images to catch up. Yet another problem may be that the users may get tired of seeing the same image repeatedly. If the user does not find the current image attractive, showing the same image may not help conversion. Embodiments address these problems by using a scoring algorithm that includes a conversion component and an uncertainty component.

The central server computer can use the scoring algorithm to find a balance between keeping the old image and rotating to a different image that can optimize the user experience and maximize the conversion rate. In the scoring algorithm, an exploitation can be a tendency to keep the old image while an exploration can be a tendency to rotate to a different image. The scoring algorithm can implement a real-time analysis that can determine an image that can drive the most conversions in the image rotation. The scoring algorithm can use a reinforcement learning technique (e.g., a multi-arm bandit algorithm) to implement the real-time analysis.

The scoring algorithm can have the following formula:

$$\text{Score}_{Comp}^{c,m,i} = \text{Score}_{CVR}^{m,i} + \text{Uncertainty}^{c,m,i} \cdot C_{ENE} + O^{c,m,i} \cdot (1 + C_{ENE})$$

where c is the user, m is the service provider, i is the image. The $\text{Score}_{Comp}^{c,m,i}$ can be a composite score for an end user c, service provider m, and image i. The $\text{Score}_{CVR}^{m,i}$ can be a conversion rate for image 'i' of service provider m over all end users. Initial conversion rates can be determined through the image rotation process previously described in FIG. 5. $\text{Uncertainty}^{c,m,i}$ can be an uncertainty score determined by using an impression discount (e.g., the more impressions, the lower the score), calculated for an individual end user c. The formula for determining $\text{Uncertainty}^{c,m,i}$ can be $$\text{Uncertainty}^{c,m,i} = \sqrt{\frac{1}{N_{c,m,i}}},$$

where $N_{c,m,i}$ is an impression count of end user c on service provider m and image i (e.g., how many times end user c was shown image i of service provider m). The $O^{c,m,i}$ can be the number of orders by an end user for the service provider m having the image i. It can help to ensure that if an end user c has converted an image i of an item from service provider m into an order, then the image i will always be displayed for end user c. The $C_{ENE}$ can be a multiplier used to control tradeoff between exploitation and exploration.

The exploitation score can be the conversion rate (CVR score) for the image aggregated over all users for each image ($\text{Score}_{CVR}^{m,i}$). The exploration score ($\text{Uncertainty}^{c,m,i} \cdot C_{ENE}$) can be based on the number of impressions the user had on the image. The more impressions, the lower the score. The algorithm introduces uncertainty ($\text{Uncertainty}^{c,m,i}$) to the CVR score ($\text{Score}_{CVR}^{m,i}$) with a multiplier $C_{ENE}$ to balance exploitation and exploration.

In the method of obtaining the composite score for each image, a composite score is generated for each image, for each user, and for each service provider. The images are scored for that user, and the image with the highest score can be selected for display to the user.

Figure 6:
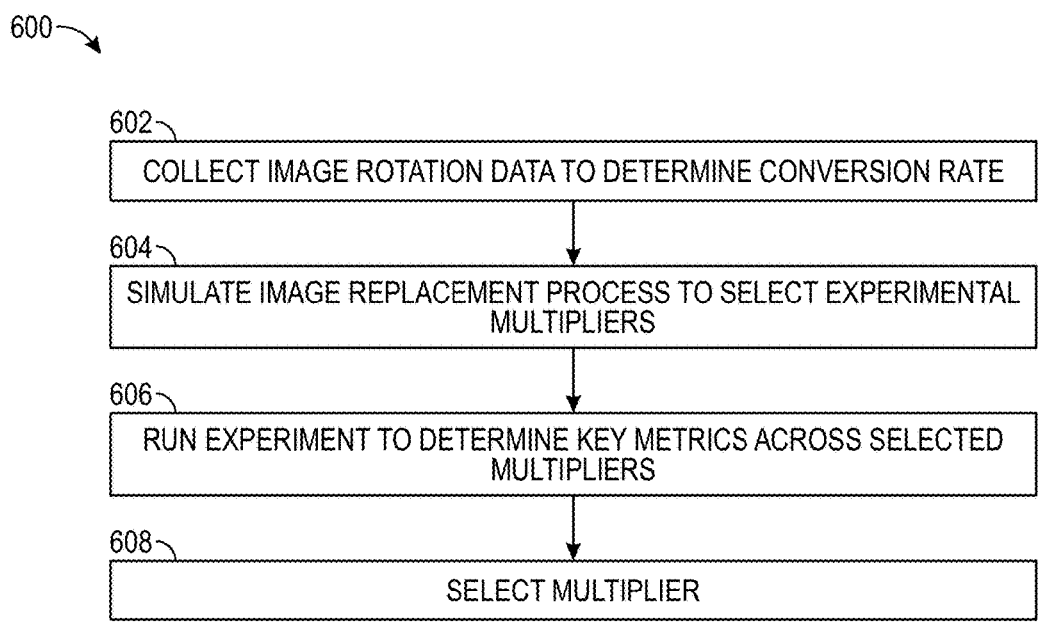
FIG. 6 shows a process flow for initializing a scoring algorithm according to embodiments.

A process flow 600 for initializing a scoring algorithm according to embodiments is shown in FIG. 6. It describes a way to determine the multiplier $C_{ENE}$. Note that other methods can also be used to determine the multiplier $C_{ENE}$.

The central server computer may gather rotation data to initialize the scoring algorithm. In step 602, for the plurality of images received, the central server computer can collect image rotation data to determine the initial conversion rate. Image rotation data can be collected using the process flow previously described in FIG. 5. The image rotation data can comprise an initial conversion rate for each image in the plurality of images.

The image rotation data is useful in determining the multiplier $C_{ENE}$. The multiplier $C_{ENE}$ can control the tradeoff between exploitation and exploration. In some embodiments, to enhance the user experience and maximize the conversion rate, the multiplier $C_{ENE}$ can be selected appropriately. In order to select the right multiplier $C_{ENE}$, an A/B test can be used to determine the optimal value of the multiplier. The A/B experiments can take time and need to ensure enough traffic when comparing different multiplier values. Therefore, when performing the A/B experiment, the search space for multipliers can first be narrowed down in 506.

To narrow down the search space for multipliers for the A/B experiment, the data gathered in 502 can be examined. The past data can comprise an initial conversion rate (CVR score) for each image determined by the central server computer. Therefore, for each service provider, the image replacement process can be simulated in 604 (e.g., how many impressions would it take to reduce the composite score to a value such that another image such as the previously determined second-best image becomes the most preferred image to display to the user?). Aggregating over all service providers, a probability of image change after X views with different multipliers can be determined.

An example table 700 of this result can be shown in FIG. 7. When the multiplier 702 is 0, there is no uncertainty and exploration, so the probability of image change is 0 regardless of the number of views. When the uncertainty multiplier 710 is very high such as 0.05, there is more weight on the exploration term, making image change frequently. As an example, service providers could change images after 3 views when the multiplier is 0.05.

Next, in 606, the central server computer can run an A/B experiment to determine key metrics across the multipliers selected in 604. In an A/B experiment, data for different variables including gross order values (gov), order frequency, monthly active users, new restaurant trials, order rate, and conversion rate for different multiplier values (e.g., 0.001, 0.005, 0.01, etc.) can be collected. Then the A/B test can be performed to compare different variables for different multiplier values, and the multiplier value with the best results for different variables can be selected in 608.

Once the multiplier $C_{ENE}$ is determined, the central server computer can begin to implement the scoring algorithm. The scoring algorithm can be applied in the method shown in FIG. 8.

Figure 8:
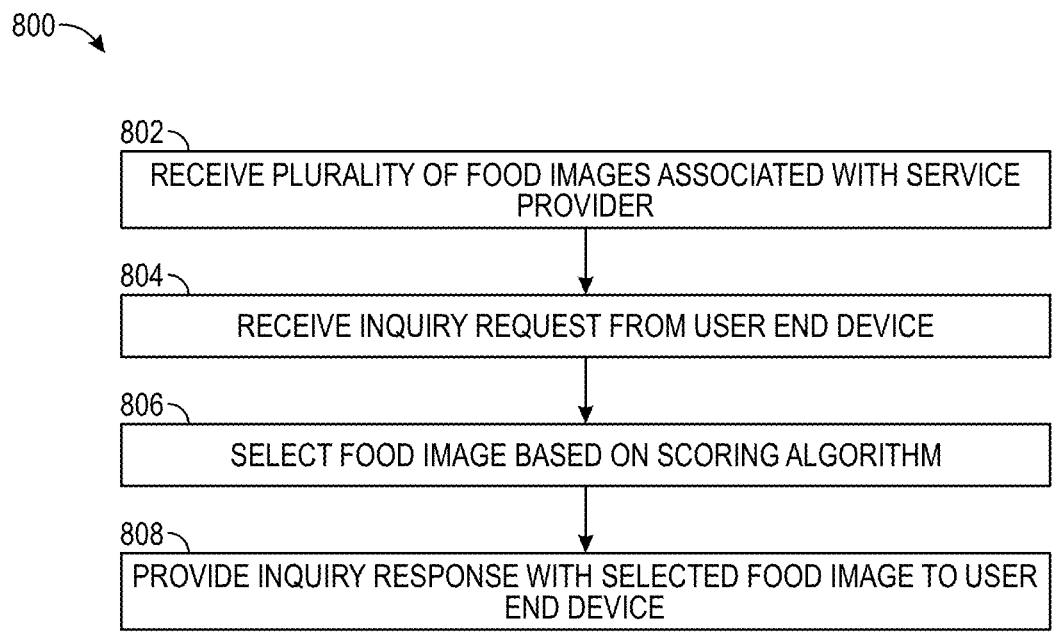
FIG. 8 shows a process flow for rotating a food image in a delivery application.

FIG. 8 shows a flow diagram 800 illustrating a method for using a scoring algorithm to select a food image according to embodiments.

In step 802, the central server computer can receive a plurality of food images associated with the service provider. The plurality of images may have already been subject to image filtering process shown in FIG. 4.

In step 804, the end user operating an end user device can open the delivery application. When the end user browses the delivery application, the end user device can send to the central server computer an inquiry request with respect to the service provider.

In step 806, upon receiving the inquiry request, the central server computer can select an image of an item of the plurality of images of the items using the scoring algorithm. The central server computer can dynamically calculate the composite model score for each image in the plurality of images. Both the exploitation term and exploration term contribute to the composite model score as described above.

The scoring algorithm according to embodiments can be conditioned to promote exploration until the central server computer finds an image that converts. An illustrative example of selecting an image using the scoring algorithm can be described. For a given user, the central server computer can explore the plurality of images (e.g., rotating amongst the plurality of images) of a service provider until it finds an image that converts. For example, the end user saw image A on day one as it has the highest composite model score on the day. The end user had seen image A for several days but did not convert. The composite model score of image A decreases due to the impression discount (e.g., more impressions corresponds to an increase in $N_{c,m,i}$, and a decrease in Uncertainty$^{c,m,i}$ term). Now, image B, with the second-best conversion rate, has a higher composite model score than A on day three and has been promoted over image A and is then presented to the end user. This process can be repeated for other images, and the central server computer can explore several images in the plurality of images until it finds an image that is likely to convert (e.g., to be purchased).

Because the central server computer is always exploring possible images to present to an end user, the composite scores of each image in the plurality of images change. This prevents the central computer from always presenting the same food item image for the same service provider to the same user. As an illustration, image A had the highest conversion rate on day one. However, the conversion rate dropped over time because users' tastes changed. Another image can have higher conversion rate and thus higher composite score than image A. The exploitation and exploration mechanism ensures fair competition among images and freshness of the images.

As a result, the scoring algorithm finds the most compelling image for a service provider from a plurality of images for every user session. The plurality of images can comprise images of top selling items and/or an image of the service provider's choice. Instead of exploiting one image, the machine learning model that uses the scoring algorithm regularly surfaces a fresh image to end users to explore and get feedback. The feedback can be used to train the model to produce better results over time. As a user engages or does not engage with the service provider, the scoring algorithm learns their preferences and adjusts the image for the service provider. For instance, if a user does not convert on image A from a service provider, the scoring algorithm surfaces a different image B to gather feedback. If a user converts on image A from a service provider, the model then fixes the image with no future changes for this service provider-user pair to ensure recognizability. As the model collects feedback from all end users, the "exploit" component of the model scales the highest conversion image (say image C) to all users.

Once the central computer has selected the image with the highest composite model score to display in the delivery application, in 708 it can provide an inquiry response comprising the selected image to the end user device operated by the end user.

Figure 9:
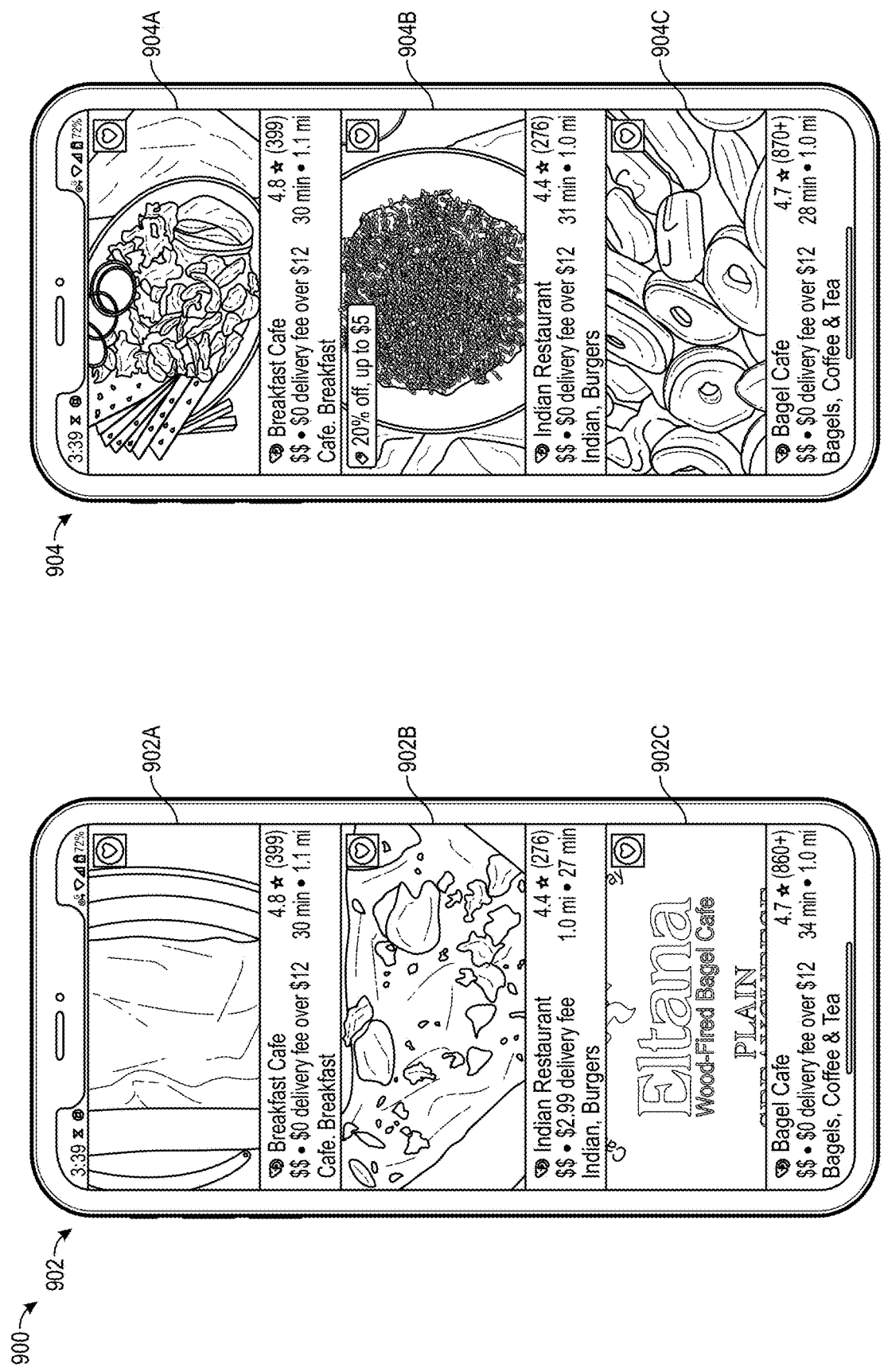
FIG. 9 shows images of service providers in a delivery application before applying embodiments and after applying embodiments.

FIG. 9 shows images 900 of service providers in a delivery application before applying embodiments (images 902) and after applying embodiments (images 904). For example, image 902A converts to image 904A, image 902B converts to image 904B, and image 902C converts to image 904C. As shown, pictures that are more representative of items of the service providers are shown in images 904 than images 902. The images 904 may also rotate to different images depending on how the conversion rate fluctuates.

The image in the inquiry response can be converted if the end user places an order with the service provider. The order can be fulfilled when the item of the service provider is delivered to the end user.

Figure 10:
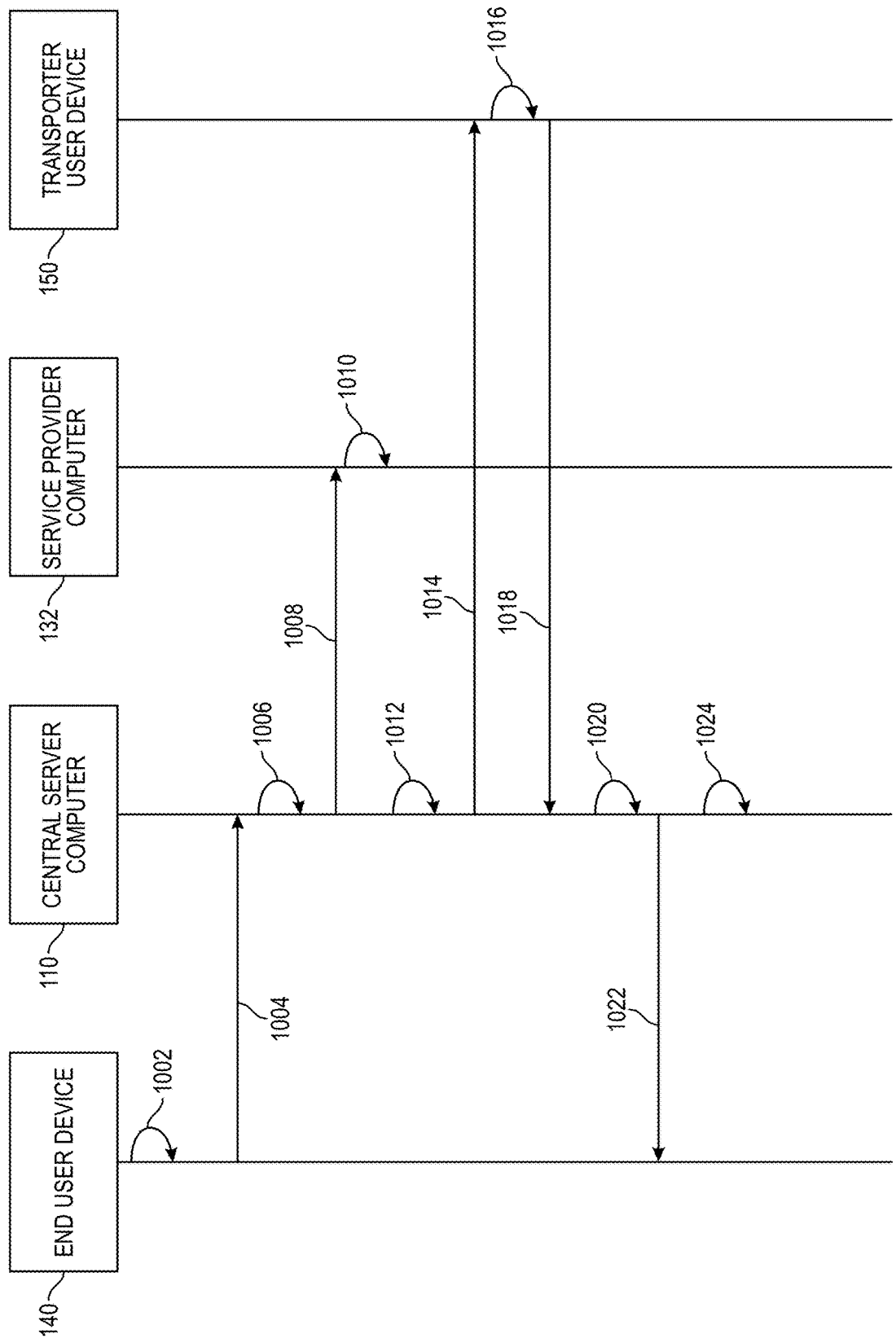
FIG. 10 shows a flow diagram illustrating a preparation and delivery method of an item.
Figure 11:
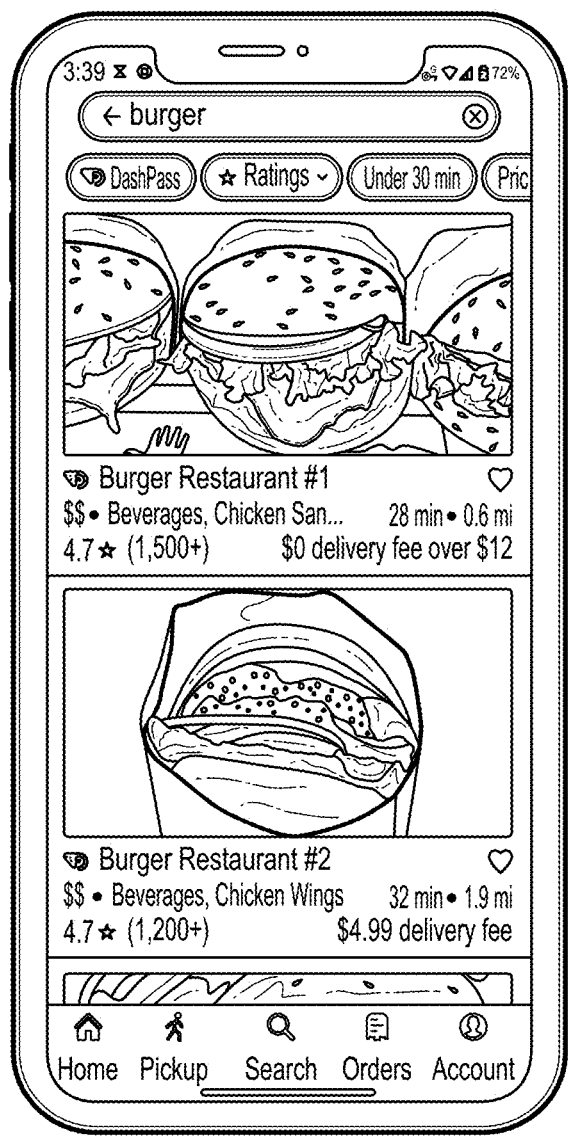
FIG. 11 shows an example search page in a delivery application.

FIG. 10 shows a flow diagram illustrating a preparation and delivery method of an item according to embodiments. The method illustrated in FIG. 10 will be described in the context of the central server computer 110 receiving a fulfillment request message from the end user device 140 to fulfill preparation and delivery of one or more items from a cart to the end user of the end user device 140. The central server computer 110 can communicate with the service provider computer 132 and the transporter user device 150 to fulfill the fulfillment request.

At step 1002, the end user device 140 can decide to check out with a cart in a central server computer delivery application installed on the end user device 140. The cart can include one or more items that are provided from a service provider of the service provider computer 132.

At step 1004, after checking out with the cart, the end user device 140 can provide a fulfillment request message including the one or more items from the cart to the central server computer 110. The fulfillment request message can also include a service provider computer identifier that identifies the service provider computer 132.

At step 1006, after receiving the fulfillment request message, the central server computer 110 can perform a transaction process with the end user device 140. For example, the central server computer 110 can communicate with a payment network to process the transaction for the one or more items. The central server computer 110 can receive an indication of whether or not the transaction is authorized. If the transaction is authorized, then the central server computer 110 can proceed with step 1008.

At step 1008, the central server computer 110 can provide the fulfillment request message, or a derivation thereof, to the service provider computer 132. The central server computer 110 can determine which service provider computer of a plurality of service provider computers to communicate with based on the service provider indicated in the fulfillment request message. For example, the fulfillment request message can indicate that the one or more items are provided by the service provider of the service provider computer 132. The central server computer 110 can identify the service provider computer 132 using the service provider computer identifier in the fulfillment request message.

At step 1010, after receiving the fulfillment request message, the service provider computer 132 can initiate preparation of the one or more items. For example, the service provider computer 132 can alert service provider personnel (e.g., those preparing the items) at the service provider location. The service providers can prepare the one or more items for pick up by a transporter.

At step 1012, after providing the fulfillment request message to the service provider computer 132, the central server computer 110 can determine one or more transporters operating one or more user devices that are capable of fulfilling the fulfillment request message. The central server computer 110 can determine the one or more transporters from the transporter user devices. The central server computer 102 can determine the one or more transporter user devices based on whether or not the transporter user device is online, whether or not the transporter user device 150 is already fulfilling a different fulfillment request message, a location of the transporter user device 150, etc.

At step 1014, after determining the one or more transporter user devices, the central server computer 110 can provide the fulfillment request message, or a derivation thereof, to the one or more transporter user devices including the transporter user device 150.

At step 1016, after receiving the fulfillment request message, the transporter of the transporter user device 150 can determine whether or not they want to perform the fulfillment. The transporter can decide that they want to perform the delivery of the one or more items from the service provider location to the end user location. The transporter user device 150 can generate an acceptance message that indicates that the fulfillment request is accepted.

At step 1018, after generating the acceptance message, the transporter user device 150 can provide the acceptance message to the central server computer 110.

After providing the acceptance message to the central server computer 110, the transporter user device 150 can communicate with a navigation network and the transporter can proceed to the service provider location to obtain the one or more items. The transporter user device 150 can then receive input from the transporter that indicates that the transporter obtained the one or more items (e.g., the transporter selects that they picked up the items). The transporter user device 150 can then communicate with the navigation network and the transporter can then proceed to the end user location to provide the one or more items to the end user. In some embodiments, the transporter user device 150 can provide update messages to the central server computer 110 that include a transporter user device 150 location and/or event data (e.g., items picked up, items delivered, etc.).

In some embodiments, after receiving the acceptance message, the central server computer 110 can notify the other transporter user devices that received the fulfillment request message that the fulfillment request is no longer available.

At step 1020, at any point after receiving the acceptance message, the central server computer 110 can check the status of the fulfillment request. For example, the central server computer 110 can determine the location of the transporter user device 150 and can determine an estimated amount of time for the transporter user device 150 to arrive at the end user location.

At step 1022, the central server computer 110 can provide an update message to the end user device 140 that includes data related to the fulfillment of the fulfillment request message. The data can include an estimated amount of time, the transporter user device location, event data (e.g., items picked up from the service provider), and/or other data related to the fulfillment of the fulfillment request message.

At step 1024, the central server computer 110 can store any data received, sent, and/or processed during the fulfillment of the fulfillment request message into a database. For example, the central server computer 110 can store a user's cart selection as user features into a user feature database.

In some embodiments, the end user may search for a particular item using a search bar. In such case, the central server computer can use image filtering to surface contextualized images on the search feed that includes the item related to what an end user has searched. By providing the image related to what the user has searched, the user does not have to search through an entire menu to look for an item. For example, in FIG. 10, when a user searches for a "burger", images related to the word "burger" for merchants are displayed in screen 1000.

In some embodiments, the plurality of images can be images of the plurality of service providers and the inquiry request can be with respect to determining a service provider of the plurality of service providers.

For example, the central server computer can determine which service providers are displayed on the homepage. The homepage of the delivery application can have a plurality of "slots" that each can display a service provider. For each slot on the homepage, the central server computer can use the scoring algorithm to determine a service provider of the plurality of service providers to display in the delivery application.

The scoring algorithm for determining a service provider image can have the following formula:

$$\text{Score}_{Comp}^{c,e} = \text{Score}_{UR}^{c,e} + C\sqrt{\frac{\log(N_c)}{N_{c,m}}}$$

where c is the end user, and e is the service provider. $\text{Score}_{Comp}^{c,e}$ can be the composite score for an end user c and service provider e. $\text{Score}_{UR}^{c,e}$ can be the universal ranking score for the end user c and the service provider e. $C_{UR}^{c,e}$ can be an exploration coefficient used to control tradeoff between exploitation and exploration. $N_c$ is the total impressions for the end user c on all recommended service providers within a defined time period, and $N_{c,m}$ is the number of impressions between the end user c and the service provider e within a defined time period.

The universal ranking score can account for the exploitation component of the scoring algorithm. The universal ranking score may be used to measure the probability of conversion for a given service provider image. The central server computer may use end user engagement features such as view/click/order history, rating, and reorder rate to calculate the universal ranking score for each end user c and service provider e.

Again, using a one time-analysis is not optimal. If the scoring algorithm were to be a direct implementation of the universal ranking score, the homepage may only display a small subset of service providers with whom the end user is already familiar with. Recommendations for new end users may be biased towards initial engagement rather than true preferences. The end user can select from thousands of service providers, making it impossible for the end user to try each service provider. The delivery application can only display a few service providers at once, and it is up to the end user to determine how long they wish to browse or scroll. Therefore, conversion data cannot be accurately collected to estimate the universal ranking score for each service provider. An uncertainty term is needed to introduce new service providers.

The uncertainty term $$\left( \sqrt{\frac{\log(N_c)}{N_{c,m}}} \right)$$

increases slowly and logarithmically as the end user's total impression increases, but decays linearly as the specific impression for a certain service provider increases. In effect, the homepage freshness is improved. For example, the end user can engage with a select few popular service providers. Although popular service providers will have high universal ranking scores, the uncertainty term of the popular service providers drops rapidly due to an increased $N_{c,m}$. On the other hand, as the total number of impressions for the end user ($N_c$) increases, a service provider without impressions would demonstrate an increase in the uncertainty term. Once the uncertainty term of the service provider without impressions becomes large enough, the composite score can outweigh the composite scores of the popular service providers. The uncertainty term allows less-popular service providers without impressions to compete for a slot on the homepage.

The uncertainty term also aids quick homepage personalization when an end user enjoys broad exploration. If the end user is making multiple impressions for various service providers, there is a consistent drop in uncertainty for each service provider. As a result, the composite score converges to the universal ranking score, which is sensitive to engagement signals such as clicks, conversions, and positive ratings.

The term can be scalable with exploration coefficient C so that embodiments can control uncertainty to avoid interrupting the end user experience. For example, if the uncertainty term dominates the scoring algorithm, then the homepage may change too much, confusing the end user. A sufficient value for the exploration coefficient C can be determined through online simulation.

Figure 12:
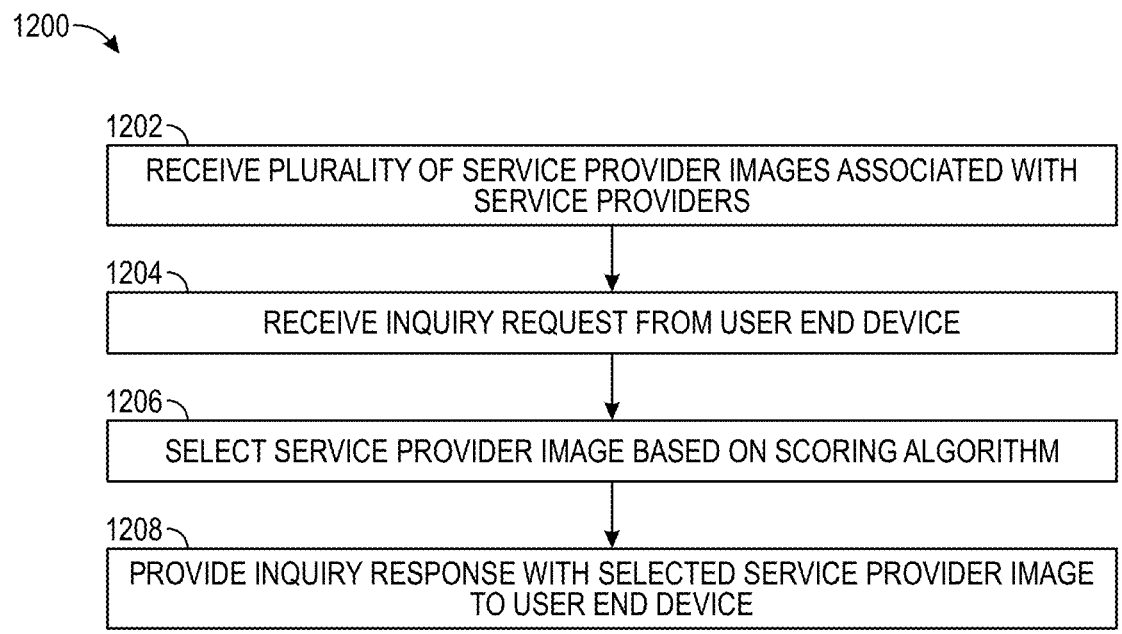
FIG. 12 shows a process flow for rotating a service provider image in a delivery application.

Embodiments can be used to select a service provider image using the process flow 1200 shown in FIG. 12.

In 1202, the central server computer can receive a plurality of service provider images. The service provider images can be associated with service providers offering items through the delivery application.

In 1204, the central server computer can receive an inquiry request from the end user device. The inquiry request may be initiated by the end user operating the end user device. For example, the end user may open the delivery application on the end user device, and the end user device may transmit the inquiry request to the central server computer.

In 1206, for each slot on the homepage, the central server computer can select a service provider image based on the scoring algorithm. The central server computer can compute a composite score for each service provider image, and using the composite scores, select a service provider image.

In 1208, the central server computer can provide an inquiry response with the selected service provider image to the user end device. The user operating the user end device may see the selected service provider image displayed in the delivery application. The user can then select the service provider image, and then may proceed to select items from the service provider for purchase and delivery as described above.

Embodiments of the invention have a number of technical advantages. Embodiments of the invention provide for efficient and effective ways to present images to users such that they will be more likely to interact with them. Embodiments of the invention can use machine learning algorithms to reduce the amount of time that an end user will spend searching for images that they are likely to interact with. This can save computer resources and time.

Although the specific embodiments described above relate to the presentation of service providers or items that can be supplied by service providers, embodiments can apply to the presentation of images in social media feeds or other contexts.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a server computer, a plurality of images associated with one or more service providers;
receiving, by the server computer from an end user device operated by an end user, an inquiry request;
determining, by the server computer, an image of the plurality of images, wherein the image is selected in response to based on a composite score based on a scoring algorithm scoring each image in the plurality of images, wherein the scoring algorithm comprises a conversion component and an uncertainty component; and
providing, by the server computer, an inquiry response comprising the image to the end user device operated by the end user,
wherein the method further comprises:
receiving, by the server computer from the end user device, a fulfillment request message comprising at least an item associated with the image;
providing, by the server computer, the fulfillment request message to a service provider computer operated by a service provider in the one or more service providers, wherein the service provider initiates preparation of at least the item; determining, by the server computer, one or more transporter user devices;
providing, by the server computer, the fulfillment request message to the one or more transporter user devices, wherein the one or more transporter user devices determine whether or not to request to accept the fulfillment request message;
receiving, by the server computer, an acceptance message from a transporter user device of the one or more transporter user devices;
generating, by the server computer, an update message indicating a status of the fulfillment request message; and
providing, by the server computer, the update message to the end user device,
wherein the conversion component is associated with an exploitation score and the uncertainty component is associated with an exploration score.

2. The method of claim 1, wherein the plurality of images are images of items of the service provider, the inquiry request is with respect to the service provider, and the image is of the item.

3. The method of claim 2, wherein the items in the plurality of images are food items.

4. The method of claim 2, wherein the scoring algorithm is formulated as:

$$\text{Score}_{Comp\square}^{c,m,i} = \text{Score}_{CVR\square}^{m,i} + \text{Uncertainty}_{\square}^{c,m,i} \cdot C_{ENE} + O_{\square}^{c,m,i} \cdot (1 + C_{ENE})_{\square},$$

and wherein $\text{Score}_{Comp}^{c,m,i}$ is the composite score, $\text{Score}_{CVR\square}^{m,i}$ is the conversion component, and wherein $\text{Uncertainty}_{\square}^{c,m,i}$ is the uncertainty component, $C_{ENE}$ is a multiplier, and $O_{\square}^{c,m,i}$ is a number of orders by the user c for the service provider m having the image i.

5. The method of claim 4 wherein $$\text{Uncertainty}_{\square}^{c,m,i} \text{ is } \sqrt{\frac{1}{N_{c,m,i}^{\square}}},$$

and wherein $N_{c,m,i}^{\square}$ is an impression count of end user c on the service provider m and image i.

6. The method of claim 2, wherein the inquiry request is associated with a possible acquisition of the item.

7. The method of claim 1, wherein the transporter user devices are operated by transporters that operate transporter vehicles, the transporters delivering the item to the end user.

8. The method of claim 7, wherein the transporter vehicles are cars.

9. The method of claim 1, wherein the one or more service providers is a plurality of service providers, and the plurality of images are images of the plurality of service providers, and the image is of the service provider.

10. The method of claim 9, wherein the service providers provide items to end users.

11. The method of claim 9, wherein the scoring algorithm is formulated as:

$$\text{Score}_{Comp\square}^{c,e} = \text{Score}_{UR\square}^{c,e} + C_{\square} \sqrt{\frac{\log(N_c^{\square})}{N_{c,m}^{\square}}},$$

and wherein $\text{Score}_{Comp}^{c,e}$ is the composite score, $\text{Score}_{UR\square}^{c,e}$ is the conversion component, $$\sqrt{\frac{\log(N_c)}{N_{c,m}}}$$

is the uncertainty component, C is a multiplier, $N_c^{\square}$ is a total number of impressions for the end user c, and $N_{c,m}^{\square}$ is a number of impressions between the end user c and the service provider e.

12. The method of claim 9, wherein the composite score for the service provider is a highest composite store among the plurality of service providers.

13. The method of claim 9, wherein the inquiry request is associated with populating a homepage of a delivery application on the end user device.

14. A server computer comprising:
a processor; and
a computer readable medium comprising code, executable by the processor for performing a method comprising:
receiving a plurality of images associated with one or more service providers;
receiving, from an end user device operated by an end user, an inquiry request;

determining an image of the plurality of images, wherein the image is selected in response to based on a composite score based on a scoring algorithm scoring each image in the plurality of images, wherein the scoring algorithm comprises a conversion component and an uncertainty component; and providing an inquiry response comprising the image to the end user device operated by the end user, wherein the method further comprises:

receiving, from the end user device, a fulfillment request message comprising at least an item associated with the image;

providing the fulfillment request message to a service provider computer operated by a service provider of the one or more service providers, wherein the service provider initiates preparation of at least the item; determining, by the server computer, one or more transporter user devices;

providing the fulfillment request message to the one or more transporter user devices, wherein the one or more transporter user devices determine whether or not to request to accept the fulfillment request message;

receiving an acceptance message from a transporter user device of the one or more transporter user devices;

generating an update message indicating a status of the fulfillment request message; and providing the update message to the end user device, wherein the conversion component is associated with an exploitation score and the uncertainty component is associated with an exploration score.

15. A system comprising:
a server computer, server computer comprising
a processor, and
a computer readable medium comprising code, executable by the processor for performing a method comprising
receiving a plurality of images associated with one or more service providers,
receiving, from an end user device operated by an end user, an inquiry request,
determining an image of the plurality of images, wherein the image is selected in response to based on a composite score based on a scoring algorithm scoring each image in the plurality of images, wherein the scoring algorithm comprises a conversion component and an uncertainty component, and
providing an inquiry response comprising the image to the end user device operated by the end user, wherein the method further comprises:

receiving, from the end user device, a fulfillment request message comprising at least an item associated with the image;

providing the fulfillment request message to a service provider computer operated by a service provider of the one or more service providers, wherein the service provider initiates preparation of at least the item; determining, by the server computer, one or more transporter user devices;

providing the fulfillment request message to the one or more transporter user devices, wherein the one or more transporter user devices determine whether or not to request to accept the fulfillment request message;

receiving an acceptance message from a transporter user device of the one or more transporter user devices;

generating an update message indicating a status of the fulfillment request message; and providing the update message to the end user device, wherein the conversion component is associated with an exploitation score and the uncertainty component is associated with an exploration score; and the end user device.

16. The system of claim 15, wherein the transporter user devices are operated by transporters that operate transporter vehicles, the transporters delivering the item to the end user.

17. The system of claim 15, wherein the service provider is a restaurant and the end user is a customer of the restaurant.

18. The system of claim 15, wherein the item is a food item.

* * * * *